United States Patent
Kobayashi et al.

(10) Patent No.: US 8,317,212 B2
(45) Date of Patent: Nov. 27, 2012

(54) MOTORCYCLE INCLUDING BENDABLE REAR FENDER

(75) Inventors: Yuuta Kobayashi, Iwata (JP); Tetsuya Hanai, Iwata (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 203 days.

(21) Appl. No.: 12/260,853

(22) Filed: Oct. 29, 2008

(65) Prior Publication Data

US 2009/0108557 A1 Apr. 30, 2009

(30) Foreign Application Priority Data

Oct. 31, 2007 (JP) ................................. 2007-284225

(51) Int. Cl.
*B62D 25/18* (2006.01)
(52) U.S. Cl. ............... 280/152.1; 280/152.2; 280/152.3; 280/154; 280/854; 280/847; 280/848; 180/219
(58) Field of Classification Search ............... 280/152.1, 280/847, 727, 152.2, 848, 152.3, 154, 854; 180/219
See application file for complete search history.

(56) References Cited

U.S. PATENT DOCUMENTS

| | | | | |
|---|---|---|---|---|
| 700,151 A * | 5/1902 | Muzzy | | 180/205.2 |
| 1,112,478 A * | 10/1914 | Roderick | | 280/152.3 |
| 2,358,206 A * | 9/1944 | Boersma | | 52/716.5 |
| 3,934,900 A * | 1/1976 | Wilson | | 280/152.3 |
| 4,422,659 A * | 12/1983 | Nebu | | 280/152.1 |
| 4,485,884 A * | 12/1984 | Fukunaga et al. | | 180/219 |
| 4,958,451 A * | 9/1990 | Iwakura et al. | | 40/204 |
| 5,322,311 A * | 6/1994 | Dunn | | 280/152.1 |
| 5,489,108 A * | 2/1996 | Slade | | 280/152.3 |
| 6,695,330 B2 * | 2/2004 | Hata | | 280/152.3 |
| 7,114,836 B2 * | 10/2006 | Sheu et al. | | 362/473 |
| 7,766,355 B2 * | 8/2010 | Ichihara | | 280/152.3 |
| 2003/0116937 A1 * | 6/2003 | Blythe | | 280/152.1 |
| 2007/0046016 A1 * | 3/2007 | Fujimoto et al. | | 280/847 |
| 2009/0008893 A1 * | 1/2009 | Ishikawa et al. | | 280/152.3 |

FOREIGN PATENT DOCUMENTS

JP 2006-069300 3/2006

* cited by examiner

*Primary Examiner* — J. Allen Shriver, II
*Assistant Examiner* — Chiedu Chibogu
(74) *Attorney, Agent, or Firm* — Keating & Bennett, LLP (57) ABSTRACT

To provide a motorcycle having a rear fender that effectively prevents a rear wheel, for example, from splashing mud and may support a light stably in accordance with various embodiments. For example, a motorcycle is disclosed for an embodiment having a rear fender that covers a rear wheel, and lights supported by the rear fender. The rear fender includes a support portion that supports the lights, and a lower mudguard extending downward from the support portion, and a dented portion is formed on a surface thereof between the support portion and the lower mudguard to extend to one edge of the rear fender in a motorcycle width direction from the other edge.

19 Claims, 8 Drawing Sheets

MOTORCYCLE INCLUDING BENDABLE REAR FENDER

CROSS-REFERENCE TO RELATED APPLICATIONS

This application is related to and claims priority to Japanese Patent Application No. 2007-284225, filed on Oct. 31, 2007, the entire contents of which is incorporated herein by reference in its entirety.

TECHNICAL FIELD

The present invention relates generally to motorcycles and more particularly for example to a rear fender that covers a rear wheel of a motorcycle.

BACKGROUND

Generally, motorcycles include a rear fender that covers a rear wheel in order to prevent the rear wheel, for example, from splashing mud. Conventionally, with some motorcycles, such a rear fender supports a light, such as a flasher and a stop lamp, arranged on a rear portion of a vehicle body. For example, Japanese Patent Application Publication No 2006-069300 discloses a rear fender that extends further downward from a position, in which the light is supported, in order to effectively prevent a rear wheel from splashing mud.

However, for a rear fender of such structure, there is a potential problem in that when a force is exerted on a portion thereof extending downward from a position, in which a light is supported, the whole fender bends. Consequently, a portion supporting the light may also be deformed and may not provide a stable supporting structure.

SUMMARY

The present invention, in accordance with one or more embodiments, is directed to such problems as described above and may provide a motorcycle, in which a light arranged on a rear portion of a vehicle body is supported by a rear fender and which may effectively prevent a rear wheel from splashing mud while supporting the light stably.

In accordance with an embodiment of the present invention, a motorcycle includes a rear fender that covers a rear wheel, and a light supported by the rear fender. The rear fender includes a support portion that supports the light, and a lower mudguard extending downward from the support portion, and is formed on a surface thereof between the support portion and the lower mudguard with a dented portion, which extends to one edge of the rear fender in a vehicle width direction from the other edge thereof.

In accordance with an embodiment of the present invention, the lower mudguard extending downward is provided to enable effective prevention of splashing of mud caused by a rear wheel. Also for an embodiment, the dented portion may be formed between the support portion and the lower mudguard, so that it may be possible to enable the whole rear fender to be prevented from bending even in the case where a force is applied on the lower mudguard, thus enabling stable support of the light.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

The description of various reference numerals and symbols in the drawings may be set forth in accordance with one or more embodiments, for example, as follows: 1: motorcycle, 3: front wheel, 4: rear wheel, 5: steering shaft, 8: front fork, 10: engine, 11: seat, 12: pivot shaft, 13: rear arm, 20: body frame, 21: head pipe, 22: main frame, 23: seat rail, 24: back stay, 30: rear fender, 30*a*: dented portion, 31: support portion, 31*b*: side plate portion (reinforcement plate portion), 32: lower mudguard, 33: front mudguard, 38: license plate, 41: light, and 51: tail lamp.

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
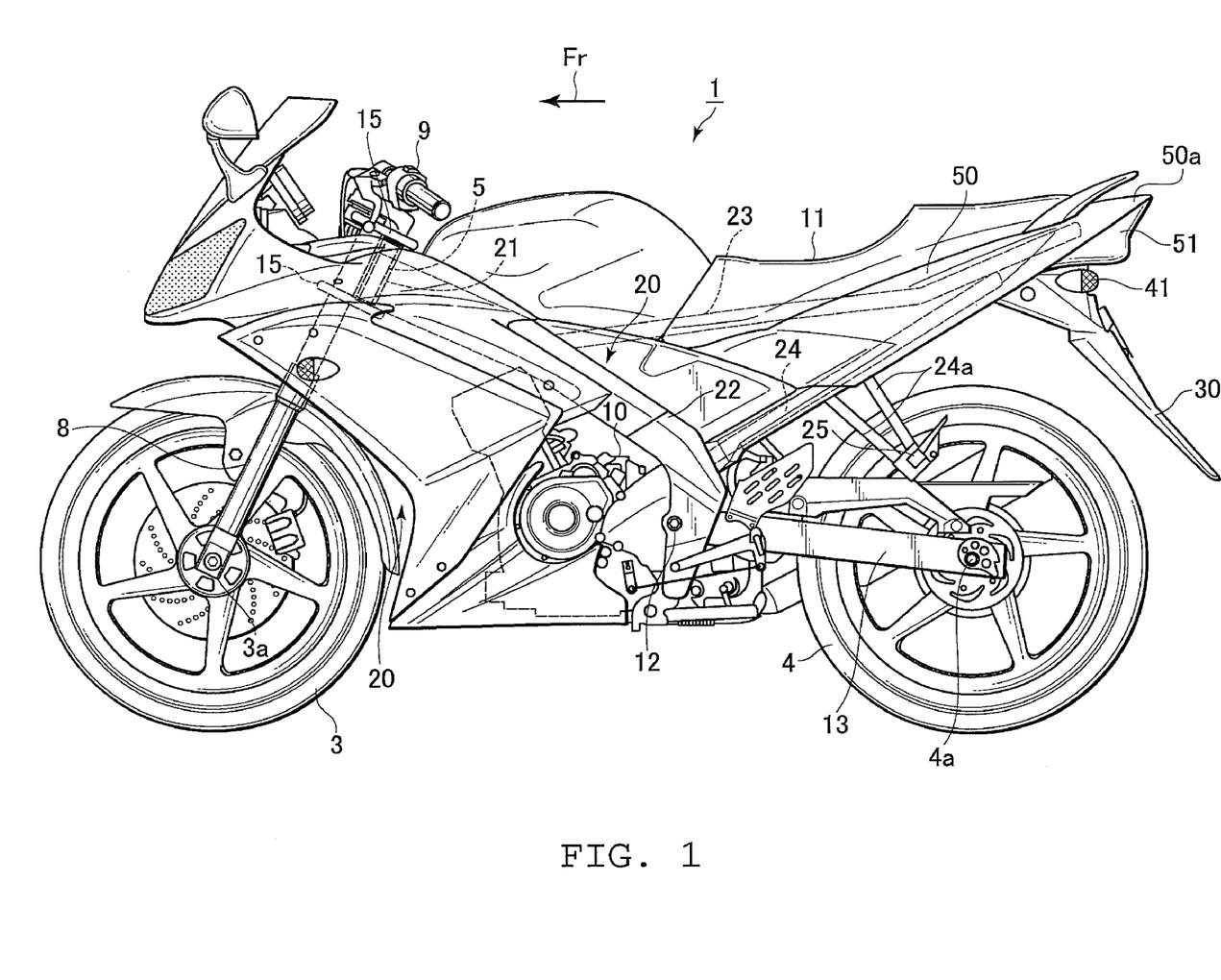
FIG. 1 is a side view showing a motorcycle in accordance with an embodiment of the invention.
Figure 2:
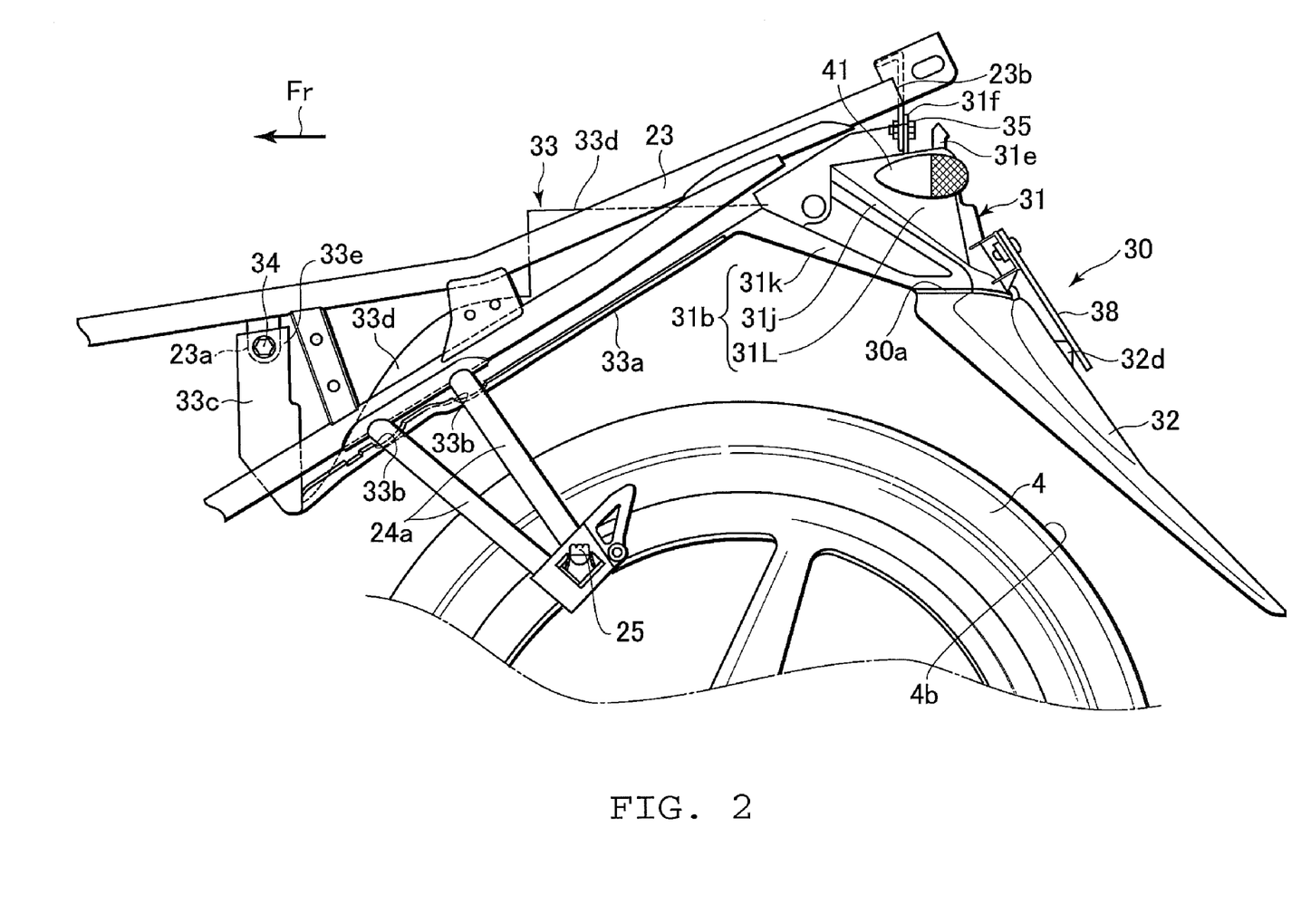
FIG. 2 is a side view showing a rear fender and a rear portion of a body frame provided on the motorcycle in accordance with an embodiment of the present invention.
Figure 3:
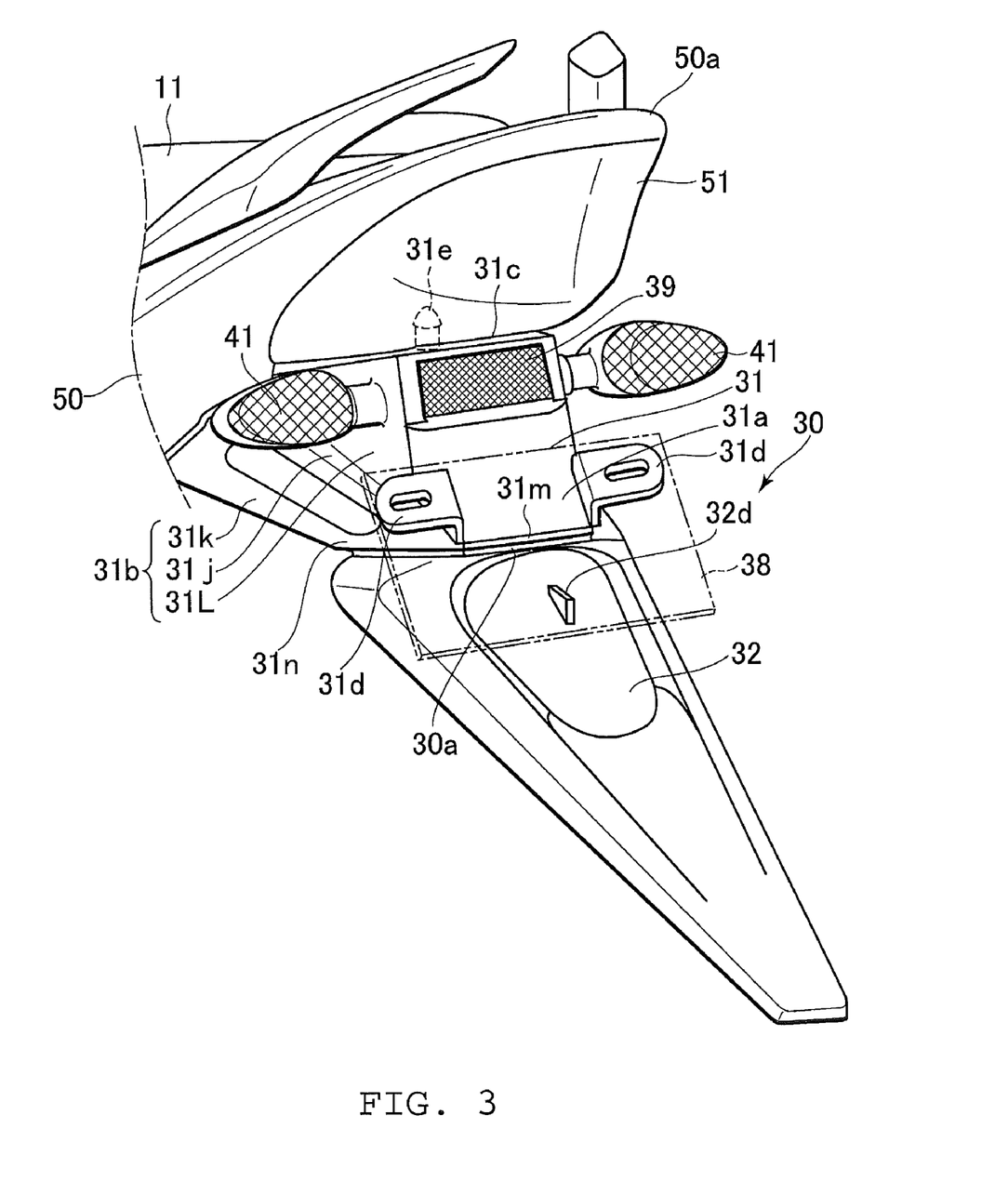
FIG. 3 is a perspective view showing the rear fender in accordance with an embodiment of the present invention.

FIG. 1 is a side view showing a motorcycle 1, FIG. 2 is a side view showing a rear fender 30 and a rear portion of a body frame 20 provided on the motorcycle 1, and FIG. 3 is a perspective view showing the rear fender 30 mounted to a vehicle body in accordance with one or more embodiments of the present invention.

As shown in FIG. 1, the motorcycle 1 includes a front wheel 3, a rear wheel 4, an engine 10, and a rear side cover 50 in addition to the rear fender 30 and the body frame 20. Also, the body frame 20 comprises a head pipe 21, main frames 22, seat rails 23, and back stays 24. In addition, the main frames 22, the seat rails 23, and the back stays 24 are provided in left and right pair in a vehicle (e.g., motorcycle) width direction. FIG. 1 shows the main frame 22, the seat rail 23, and the back stay 24 on the left side in a vehicle traveling direction (e.g., a forward direction indicated by Fr).

The head pipe 21 is arranged at a front end of the body frame 20 to support a steering shaft 5 rotatably. The steering shaft 5 is connected to a front fork 8 through a bracket (not shown). An axle shaft of the front wheel 3 is supported by a lower end of the front fork 8. An upper portion of the steering shaft 5 is connected to a handle 9 through two brackets 15, 15 aligned vertically. The handle 9 together with the front fork 8 and the front wheel 3 turns left and right about the steering shaft 5.

Front ends of the main frames 22 are connected to the head pipe 21. The main frames 22 extend obliquely downward toward the rear of a vehicle body. The engine 10 is arranged below the main frames 22 and suspended by the main frames 22. A pivot shaft 12 supported by the main frames 22 is arranged rearwardly of the engine 10. A front end of a rear arm 13 is mounted to the pivot shaft 12. A rear end of the rear arm 13 supports an axle shaft 4a of the rear wheel 4 arranged on the rear of a vehicle body. A driving force output from the engine 10 is transmitted to the rear wheel 4 through a chain (not shown).

Front ends of the seat rails 23 are connected to intermediate positions on the main frames 22 extending rearward. The seat rails 23 extend toward the rear of a vehicle body to support a seat 11 arranged thereabove.

Front ends of the back stays 24 are connected to the main frames 22. The back stays 24 extend obliquely upward toward the rear of a vehicle body from front ends thereof. Rear ends of the back stays are connected to the seat rails 23. Footrests 25, on which a fellow passenger seated on the seat 11 behind a driver puts feet, are provided laterally (outward in the vehicle width direction) of the rear wheel 4. A pair of footrest stays 24a, 24a extending obliquely downward are connected to intermediate positions on the back stays 24 and the footrests 25 are provided at tip ends of the footrest stays 24a, 24a.

The rear side cover 50 extends laterally of the seat rails 23 and the back stays 24 in a longitudinal direction to cover the seat rails 23 and the back stays 24 laterally. Also, the rear side cover 50 is curved so that its center in a vertical direction bulges laterally. As shown in FIG. 1 or 3, a tail lamp 51 is arranged below a rear end 50a of the rear side cover 50. A front side of the tail lamp 51 is mounted to brackets provided at rear ends of, for example, the seat rails 23.

The rear fender 30 is arranged radially outwardly of the rear wheel 4 to cover the rear wheel 4 from obliquely upward. As shown in FIG. 2 or 3, the rear fender 30 includes a support portion 31 positioned below the tail lamp 51 to support lights (here, for example, direction indicators) 41, 41, a lower mudguard 32 extending downward from the support portion 31, and a front mudguard 33 extending forward from the support portion 31.

Figure 4:
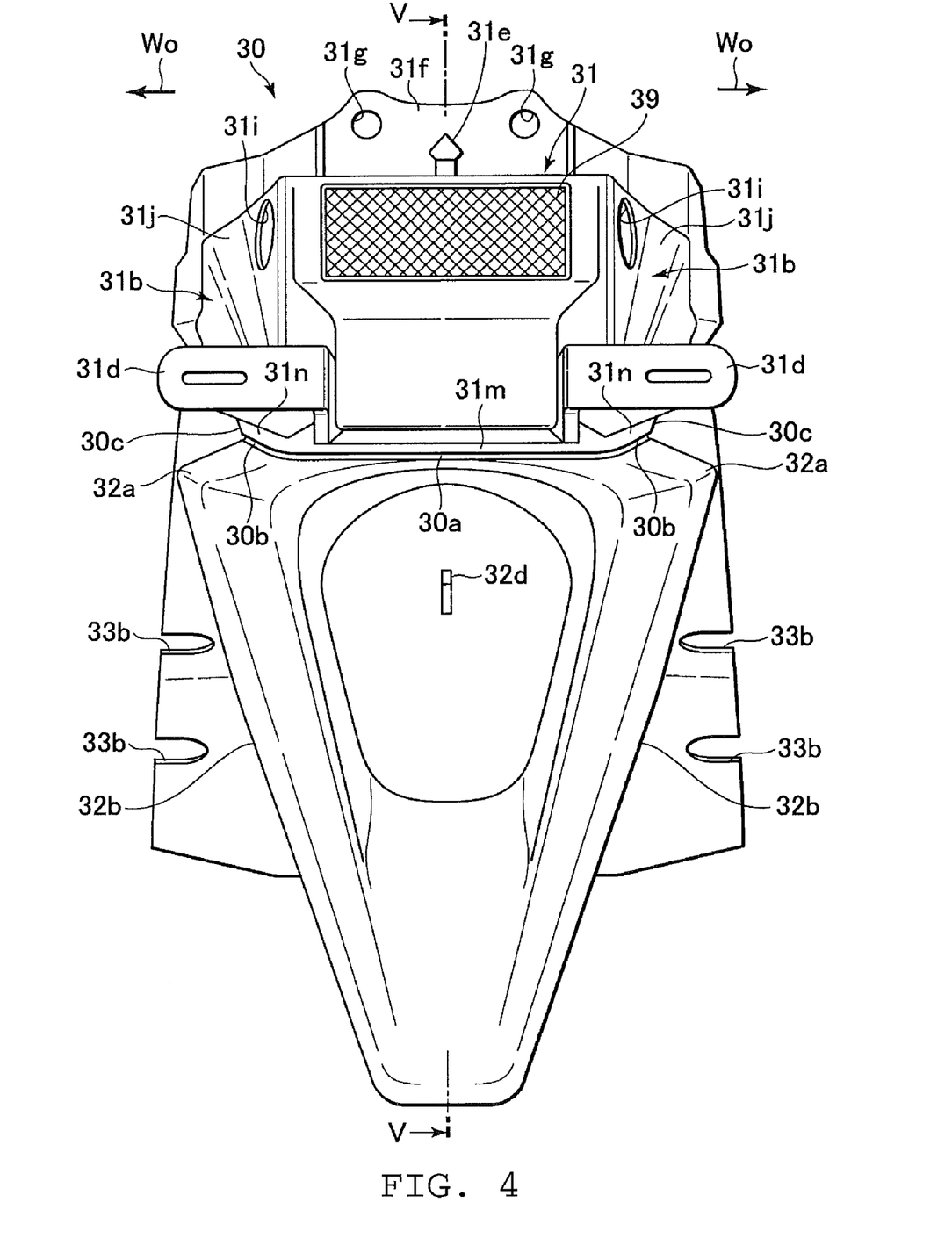
FIG. 4 is a rear view showing the rear fender in accordance with an embodiment of the present invention.
Figure 5:
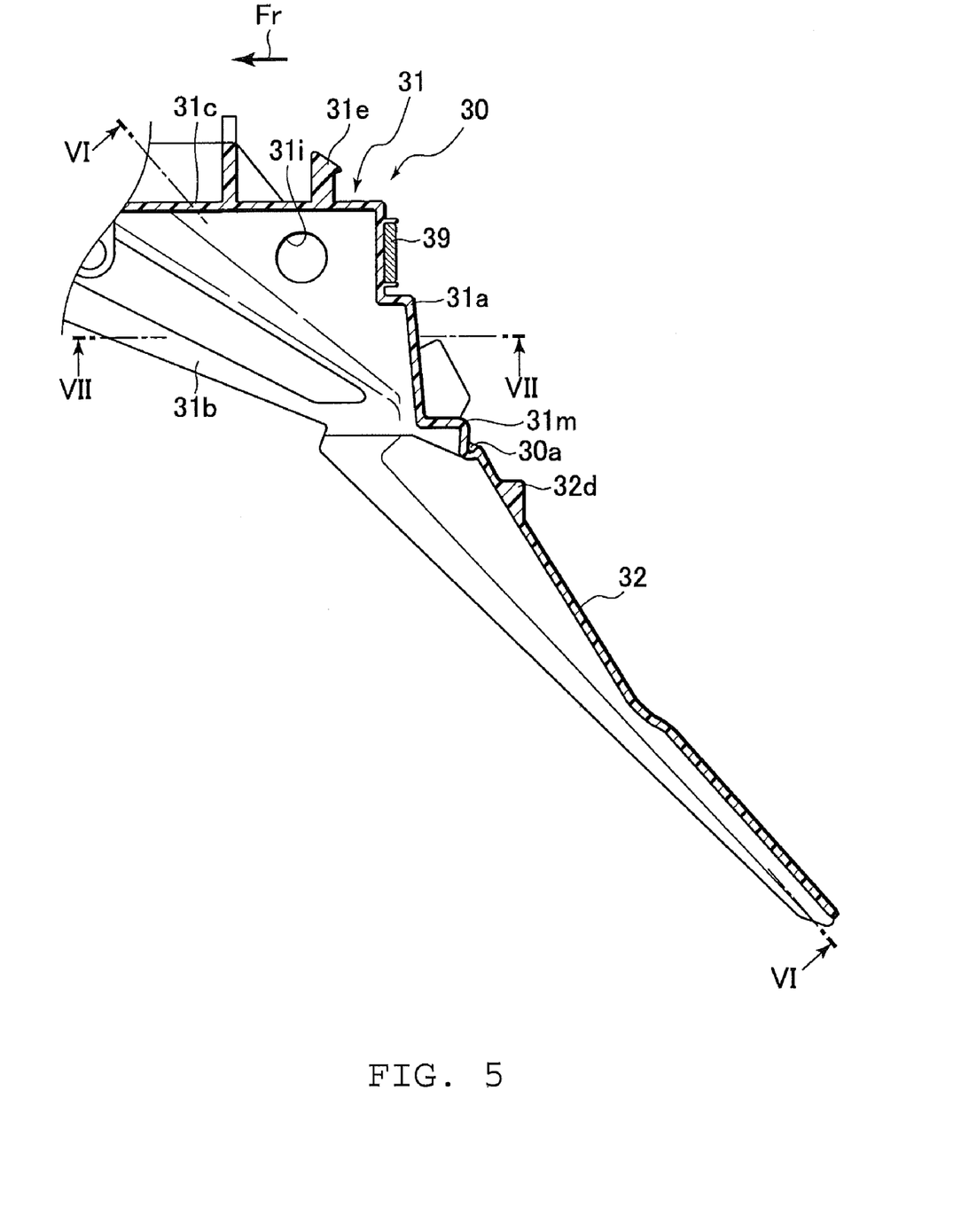
FIG. 5 is a cross sectional view taken along the line V-V in FIG. 4 in accordance with an embodiment of the present invention.
Figure 6:
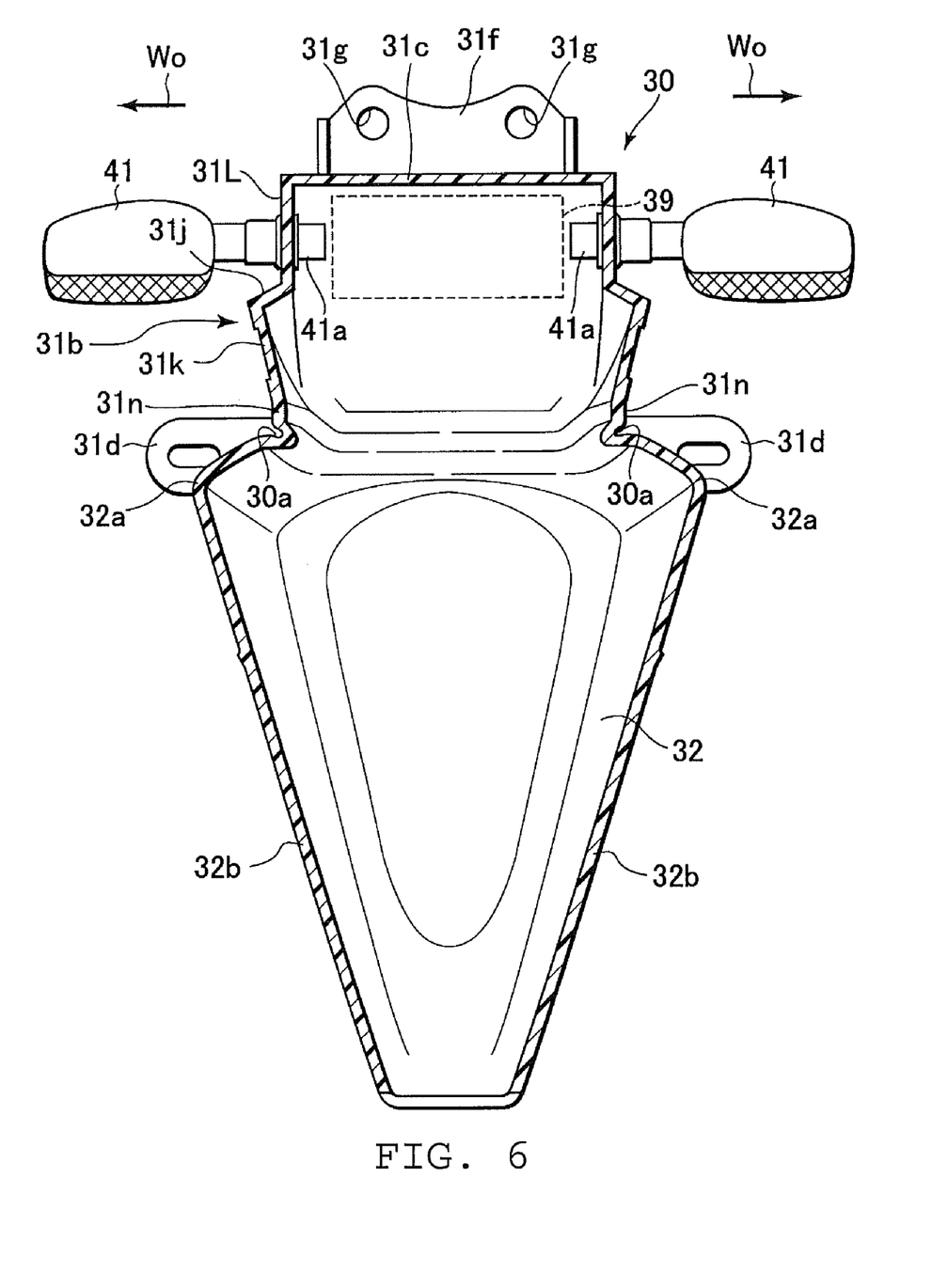
FIG. 6 is a cross sectional view taken along the line VI-VI in FIG. 5 in accordance with an embodiment of the present invention.
Figure 7:
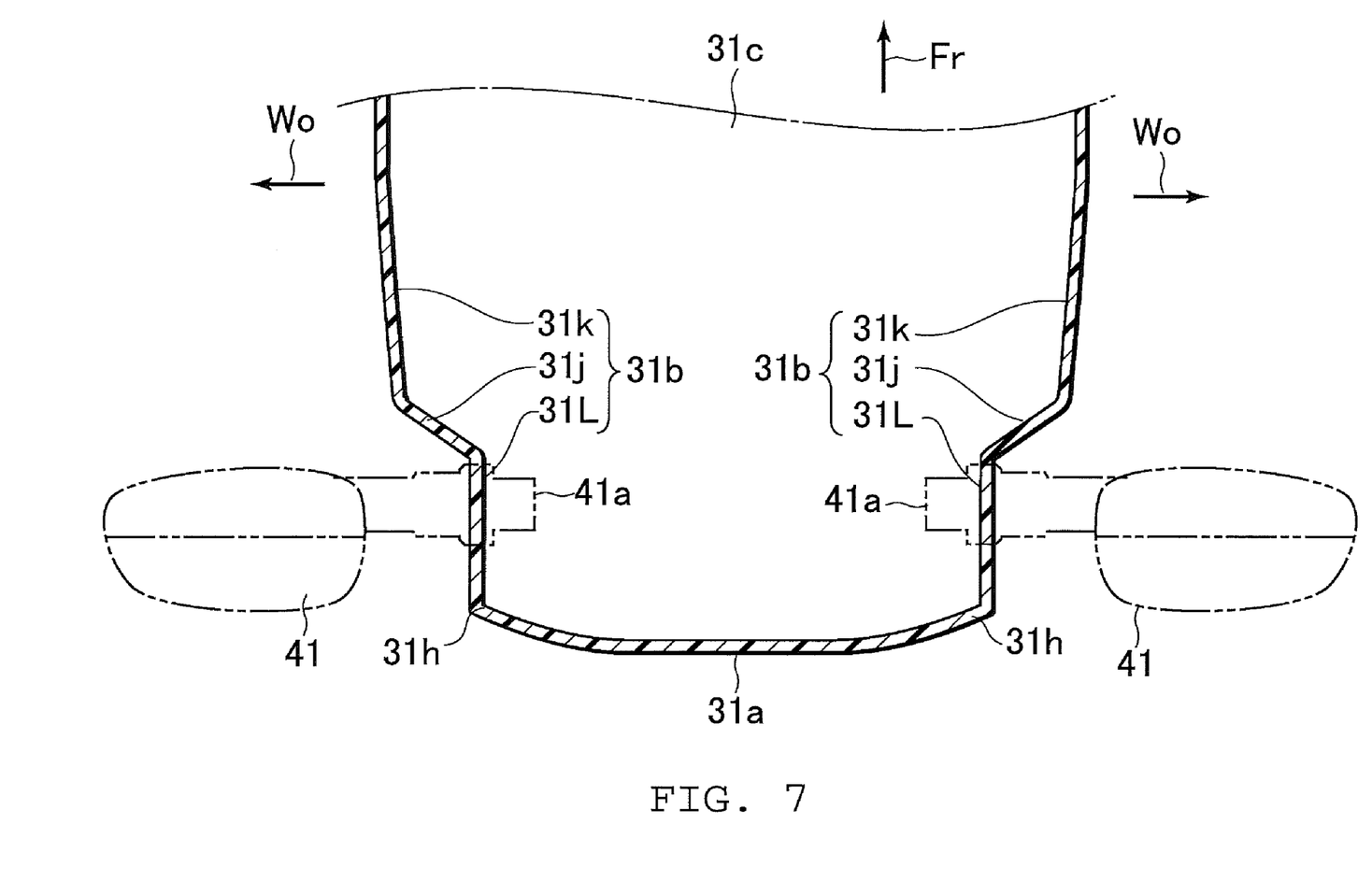
FIG. 7 is a cross sectional view taken along the line VII-VII in FIG. 5 in accordance with an embodiment of the present invention.

FIG. 4 is a rear view showing the rear fender 30, FIG. 5 is a cross sectional view taken along the line V-V in FIG. 4, FIG. 6 is a cross sectional view showing the rear fender 30 and taken along the line VI-VI in FIG. 5, and FIG. 7 is a cross sectional view showing the rear fender 30 and taken along the line VII-VII in FIG. 5.

The front mudguard 33 is arranged to extend forward below the seat 11 and between the pair of left and right back stays 24 (see FIG. 2). The front mudguard 33 covers the rear wheel 4 from obliquely forward and a lower surface thereof is curved correspondingly to an outer peripheral surface of the rear wheel 4. Also, formed on an upper surface of the front mudguard 33 are a plurality of projections 33d conformed to a shape of a part (for example, electronic equipment such as a battery) arranged between the seat 11 and the front mudguard 33.

As shown in FIG. 2, an edge 33a of the front mudguard 33 in the vehicle width direction is formed in a flanged manner. The edge 33a extends forward below and along the back stays 24. Also, notches 33b, 33b are formed on the edge 33a in order to avoid interference with the footrest stays 24a, 24a extending obliquely downward from the back stays 24 (see FIGS. 2 and 4). A front end 33c of the front mudguard 33 extends upward (toward the seat rails 23) and a mount portion 33e being mounted to brackets 23a of the seat rails 23 bolts 34 is provided on the front end 33c.

The support portion 31 is substantially in the form of a box opened at a surface thereof toward the rear wheel 4 and includes a rear plate portion 31a, which constitutes a back surface of the support portion 31, a pair of left and right side plate portions (reinforcement plate portions) 31b, 31b, which constitute sides, and an upper plate portion 31c, which constitutes an upper surface.

The rear plate portion 31a is substantially rectangular-shaped and arranged to face the outer peripheral surface 4b of the rear wheel 4 (see FIG. 2 or 7). As shown in FIG. 3, a reflection plate 39 that reflects light irradiated from the rear of a vehicle body is mounted to the rear plate portion 31a. Also, a license plate 38 is arranged below the reflection plate 39. Mount portions 31d, 31d extending in the vehicle width direction are formed in positions on the rear plate portion 31a below the reflection plate 39 and the license plate 38 is mounted to the mount portions 31d, 31d.

The upper plate portion 31c extends forward from an upper edge of the rear plate portion 31a and the tail lamp 51 is arranged above the upper plate portion. An upwardly projecting projection 31e is formed on an upper surface of the upper plate portion 31c. The projection 31e is inserted into a mount hole (not shown) formed on a lower surface of the tail lamp 51 (see FIG. 3) and the upper plate portion 31c supports the tail lamp 51 from under. Also, as shown in FIG. 4 or 5, a mount wall portion 31f is formed on the upper surface of the upper plate portion 31c to rise upward from the upper surface. The mount wall portion 31f is mounted to a bracket 23b provided at rear ends of the seat rails 23 by bolts 35 (see FIG. 2). In addition, as shown in FIG. 4, mount holes 31g, 31g, into which the bolts 35 are inserted, are formed on the mount wall portion 31f. Also, the front mudguard 33 described above is contiguous to the upper plate portion 31c.

The side plate portions 31b, 31b are substantially triangular-shaped to rise forward from edges 31h, 31h of the rear plate portion 31a (see FIG. 7). Upper edges of the side plate portions 31b are contiguous to an edge of the rear plate portion 31a in the vehicle width direction (see FIG. 5). As shown in FIG. 5, the side plate portion 31b is formed with a mount hole 31i. Base portions 41a of the lights 41 are inserted into the mount holes 31i and thus, the lights 41 are supported (see FIG. 6 or 7).

As shown in FIG. 3 or 7, the side plate portion 31b is formed with an obliquely vertically extending step 31j and a front portion 31k of the side plate portion 31b is positioned outwardly (direction indicated by Wo in FIG. 7) of a rear portion 31L formed with the mount hole 31i in the vehicle width direction. In addition, as shown in FIG. 2, the step 31j is formed to extend toward the license plate 38 from rear ends of the back stays 24.

The lower mudguard 32 is plate-shaped and provided to extend obliquely downward from a lower edge 31m of the rear plate portion 31a and lower edges 31n of the side plate portions 31b. Also, the lower mudguard 32 is provided to face the outer peripheral surface of the rear wheel 4 (see FIG. 2). As shown in FIG. 6, the lower mudguard 32 spreads outwardly of the lower edges 31n, 31n of the side plate portions 31b, 31b in the vehicle width direction and ends 32a, 32a of the lower mudguard 32 in the vehicle width direction are positioned outwardly of the side plate portions 31b, 31b in the vehicle width direction. Edges 32b, 32b of the lower mudguard 32 in the vehicle width direction spread outwardly of the lower edges 31n, 31n in the vehicle width direction and extend downward.

In addition, as shown in FIG. 5, the lower mudguard 32 is formed with an upwardly (rearwardly) rising projection 32d. As shown in FIG. 2, an end of the projection 32d abuts against a back surface of the license plate 38.

As shown in FIG. 5 or 6, a dented portion 30a is formed in a position between the support portion 31 and the lower mudguard 32 on a surface of the rear fender 30. The dented portion 30a extends to one edge 30c of the rear fender 30 in the vehicle width direction from the other edge 30c and is formed in the form of a groove crossing the rear fender 30 in the vehicle width direction (see FIG. 4). With the motorcycle 1, the dented portion 30a is formed between the lower edge 31m of the rear plate portion 31a and the lower mudguard 32 and between the lower edges 31n of the side plate portions 31b and the lower mudguard 32 (see FIGS. 4 to 6). Also, in this example, the dented portion 30a is L-shaped in cross section.

Figure 8:
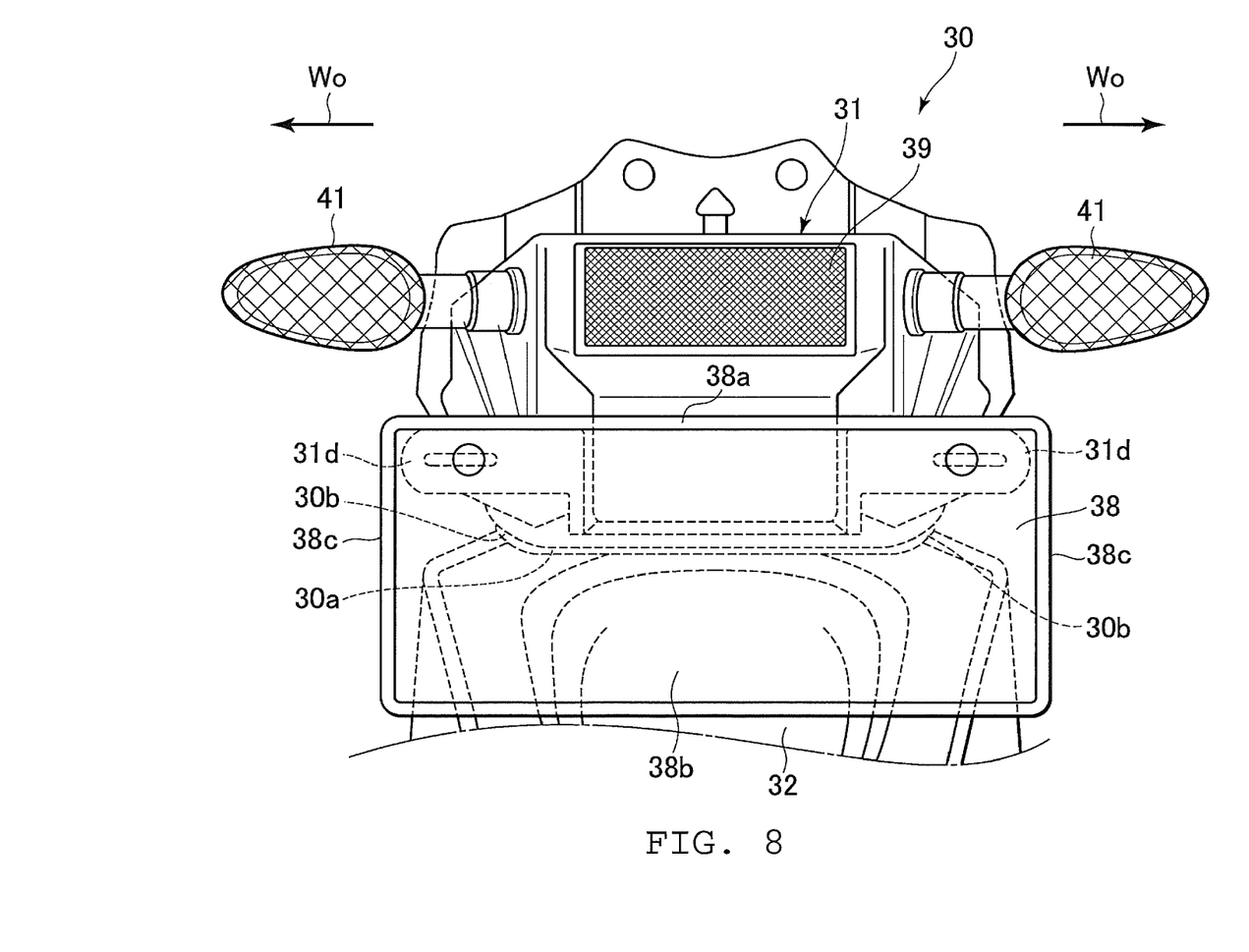
FIG. 8 is a rear view showing the rear fender, to which a license plate is mounted in accordance with an embodiment of the present invention.

The dented portion 30a is covered by the license plate 38 from rearwardly of the rear fender 30. FIG. 8 is a rear view showing an upper portion of the rear fender 30, to which the license plate 38 is mounted. As shown in FIG. 8, the dented portion 30a is positioned between an upper edge 38a and a lower edge 38b of the license plate 38. Also, ends 30b, 30b of the dented portion 30a in the vehicle width direction are positioned toward a center in the vehicle width direction, relative to edges 38c, 38c of the license plate 38 in the vehicle width direction. Therefore, the dented portion 30a is covered by the license plate 38 from rearwardly of the rear fender 30.

The motorcycle 1 described above in accordance with one or more embodiments may include the rear fender 30 that covers the rear wheel 4, and the lights 41 supported by the rear fender 30. The rear fender 30 includes the support portion 31 that supports the lights 41, and the lower mudguard 32 extending downward from the support portion 31, and the dented portion 30a is formed between the support portion 31 and the lower mudguard 32 to extend to one edge of the rear fender 30 in the vehicle width direction from the other edge.

The motorcycle 1 is provided with the downwardly extending lower mudguard 32 to enable, for example, effective prevention of splashing of mud caused by the rear wheel 4. Also, the dented portion 30a is formed between the support portion 31 and the lower mudguard 32 to enable the whole rear fender 30 to be prevented from bending even in the case where a force is applied on the lower mudguard 32, thus enabling the lights 41 to be supported stably.

With the motorcycle 1, the support portion 31 supports the tail lamp 51 from underneath. Therefore, it may be possible to support the tail lamp 51 stably as compared with the case where only the front portion of the tail lamp 51 is supported by the body frame 20.

Also in accordance with an embodiment, the support portion 31 includes the rear plate portion 31a extending in the vehicle width direction and the side plate portions 31b rising from the rear plate portion 31a. Therefore, the support portion 31 becomes hard to bend, thus enabling the lights 41 to be supported stably. The side plate portions 31b are provided in left and right pair to face each other in the vehicle width direction. Therefore, the support portion 31 becomes further hard to bend.

Also in accordance with an embodiment, with the motorcycle 1, the lower mudguard 32 spreads laterally from the lower edges 31n of the side plate portions 31b and extends downward. Therefore, it may be possible to effectively prevent the rear wheel from splashing mud.

Also in accordance with an embodiment, with the motorcycle 1, the license plate 38 is mounted to the support portion 31 and the lower edge 38b of the license plate 38 is positioned to be lower than the dented portion 30a. Therefore, it may be possible to prevent that degradation in outward appearance, which the dented portion 30a is formed to cause.

In addition, it should be understood that the invention is not limited to the motorcycle 1 described above but rather is susceptible to various modifications that fall within the scope of the present invention. For example in accordance with an embodiment, the dented portion 30a is L-shaped in cross section in the descriptions. However, the dented portion 30a may be in the form of a groove, as an example. Also in accordance with an embodiment, the dented portion 30a may be formed to be smaller in thickness than the remaining portions of the rear fender 30.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A motorcycle comprising:
    a monolithic rear fender arranged to cover a rear wheel, the monolithic rear fender including a support portion, an indented portion, and a lower mudguard; and
    a light directly supported by the support portion of the monolithic rear fender; wherein
    the indented portion is arranged between the support portion and the lower mudguard such that the lower mudguard extends downward from the indented portion, the indented portion extending from a first edge of the monolithic rear fender to a second edge of the monolithic rear fender in a motorcycle width direction;
    the indented portion is arranged to allow the lower mudguard to bend about the indented portion when a force is applied to the lower mudguard;
    the lower mudguard extends laterally outward in the motorcycle width direction such that side ends of the lower mudguard are positioned outwardly of side ends of the indented portion in the motorcycle width direction;
    a license plate is mounted to the support portion;
    a lower edge of the license plate extends to a point lower than the indented portion; and
    the support portion includes an upper portion directly above at least a portion of the indented portion, and the upper portion includes a mount wall portion attached to a frame of the motorcycle.

2. The motorcycle according to claim 1, wherein the support portion includes a plate portion extending in the motorcycle width direction and at least one reinforcement plate portion extending upward from the plate portion.

3. The motorcycle according to claim 2, wherein the support portion includes two reinforcement plate portions arranged to face each other in the motorcycle width direction.

4. The motorcycle according to claim 3, wherein the lower mudguard extends downwardly below the side ends of the indented portion.

5. The motorcycle according to claim 1, wherein the indented portion of the monolithic rear fender has a reduced thickness relative to remaining portions of the monolithic rear fender.

6. The motorcycle according to claim 1, wherein the indented portion defines a groove in the monolithic rear fender extending from the first edge of the monolithic rear fender to the second edge of the monolithic rear fender in the motorcycle width direction.

7. The motorcycle according to claim 1, wherein the support portion of the monolithic rear fender is arranged to not bend when the lower mudguard bends about the indented portion when the force is applied to the lower mudguard.

8. A motorcycle comprising:
   a rear wheel;
   a monolithic rear fender disposed at least partially above the rear wheel, the monolithic rear fender including a support portion, an indented portion, and a lower mudguard; and
   a light coupled to the monolithic rear fender and directly supported by the support portion; wherein
   the indented portion is arranged between the support portion and the lower mudguard and extends across the monolithic rear fender in a motorcycle width direction from a first edge of the monolithic rear fender to a second edge of the monolithic rear fender;
   the indented portion prevents the support portion of the monolithic rear fender from bending when a force is applied to the lower mudguard;
   the lower mudguard extends laterally outward in the motorcycle width direction such that side ends of the lower mudguard are positioned outwardly of side ends of the indented portion in the motorcycle width direction;
   a license plate is mounted to the support portion;
   a lower edge of the license plate extends to a point lower than the indented portion; and
   the support portion includes an upper portion directly above at least a portion of the indented portion, and the upper portion includes a mount wall portion attached to a frame of the motorcycle.

9. The motorcycle according to claim 8, wherein the support portion includes a plate portion extending in the motorcycle width direction and at least one reinforcement plate portion extending upward from the plate portion.

10. The motorcycle according to claim 9, wherein the support portion includes two reinforcement plate portions arranged to face each other in the motorcycle width direction.

11. The motorcycle according to claim 9, wherein the lower mudguard extends downwardly below the side ends of the indented portion.

12. The motorcycle according to claim 8, wherein the indented portion of the monolithic rear fender has a reduced thickness relative to remaining portions of the monolithic rear fender.

13. The motorcycle according to claim 8, wherein the indented portion defines a groove in the monolithic rear fender extending from the first edge of the monolithic rear fender to the second edge of the monolithic rear fender in the motorcycle width direction.

14. The motorcycle according to claim 1, wherein the support portion, the indented portion, and the lower mudguard of the monolithic rear fender are defined by a single, unitary member.

15. The motorcycle according to claim 8, wherein the support portion, the indented portion, and the lower mudguard of the monolithic rear fender are defined by a single, unitary member.

16. The motorcycle according to claim 1, wherein the frame is attached to the mount wall portion directly above the upper portion.

17. The motorcycle according to claim 1, wherein the monolithic rear fender includes a front mudguard extending forward from the support portion, and the front mudguard is attached to another portion of the frame.

18. The motorcycle according to claim 8, wherein the frame is attached to the mount wall portion directly above the upper portion.

19. The motorcycle according to claim 8, wherein the monolithic rear fender includes a front mudguard extending forward from the support portion, and the front mudguard is attached to another portion of the frame.

* * * * *